US005277570A

United States Patent [19]

Siggers

[11] Patent Number: 5,277,570

[45] Date of Patent: Jan. 11, 1994

[54] PRESS FOR PRESSING A COMPRESSIBLE MATERIAL

[76] Inventor: David L. Siggers, 1090 Choctaw, Camden, Ark. 71701

[21] Appl. No.: 860,170

[22] Filed: Mar. 30, 1992

[51] Int. Cl.[5] .............................................. B29C 43/02

[52] U.S. Cl. .................................... 425/195; 425/352; 425/354; 425/411; 425/420; 425/422; 425/439; 425/444

[58] Field of Search ................. 425/78, 188, 193, 195, 425/352, 354, 355, 405.1, 406, 411, 412, 420, 422, 439, 444, 812; 264/102, 123, 125, 126

[56] References Cited

U.S. PATENT DOCUMENTS

| | | | |
|---|---|---|---|
| 2,380,659 | 7/1945 | McDougal | 425/355 |
| 2,437,127 | 3/1948 | Richardson | 425/78 |
| 2,851,725 | 9/1958 | Bauer | 425/355 |
| 2,881,478 | 4/1959 | Gruenberg | 425/195 |
| 2,994,106 | 8/1961 | Posey | 425/195 |
| 3,258,514 | 6/1966 | Roach | 425/78 |
| 3,313,871 | 4/1967 | Vogel et al. | 425/78 |
| 4,009,977 | 3/1977 | Chao | 425/78 |
| 4,631,015 | 12/1986 | Shigeo et al. | 425/352 |
| 4,785,574 | 11/1988 | Fiorentino | 425/78 |
| 4,966,538 | 10/1990 | Linke et al. | 425/352 |

FOREIGN PATENT DOCUMENTS

| | | | |
|---|---|---|---|
| 338417 | 5/1972 | U.S.S.R. | 425/352 |
| 1295055 | 11/1972 | United Kingdom | 425/439 |

*Primary Examiner*—Scott Bushey

[57] ABSTRACT

An apparatus and method is disclosed for an improved press for pressing a compressible material such as a deformable plastic material with a fluid under pressure from a fluid pressure source. The press incorporates a press cylinder having a press cylinder bore for removably receiving a sleeve defining a sleeve bore. The sleeve bore is adapted to receive the compressible material between a first and a second forming tool. The fluid from the pressure source is applied to the first and second forming tools to press the compressible material therebetween.

25 Claims, 7 Drawing Sheets

PRESS FOR PRESSING A COMPRESSIBLE MATERIAL

BACKGROUND OF THE INVENTION

Field of the Invention

This invention relates to hydraulic presses for forming an object with a forming tool set and more particularly to a high pressure hydraulic press and forming tool combination of substantially reduced size, weight and cost.

BACKGROUND OF THE INVENTION

The use of hydraulic presses for forming objects with a forming tool set have long been used by the prior art. Typically, the hydraulic press comprises a hydraulic cylinder having a piston therein with a ram extending outwardly from the hydraulic cylinder. The outwardly extending ram was affixed to a first portion of the forming tool set containing the object or the material to be formed. Upon application of hydraulic pressure into the hydraulic cylinder, the hydraulic piston would move the ram to apply pressure to the first portion of the forming tool set for forming the object therein. In some instances, multiple rams were used for applying pressure to both a first and a second portion of the forming tool set.

In general, the hydraulic cylinder was mounted on an external frame with the ram extending outwardly from the hydraulic cylinder within the external frame. In many cases, the first portion of the forming tool set was slidably aligned by the external frame to the second portion of the forming tool set that was secured to the external frame. When multiple rams were used for applying pressure to both the first and the second portion of the forming tool set, the external frame was typically used to align the first portion of the forming tool set relative to the second portion of the forming tool set.

If the hydraulic cylinder was required to exert a substantial force on the object or the material to be formed, a substantial external frame was dictated in order to maintain the alignment of the first portion of the forming tool set relative to the second portion of the forming tool set. Accordingly, the external frame supporting the hydraulic cylinder and the forming tool set was required to be substantial in nature to avoid misalignment or deformation of the forming tool set or to avoid misalignment or deformation of the external frame due to the force produced by the rams.

When multiple rams were used for applying pressure to both the first and the second portion of the forming tool set, the external frame was required to support not only a first and a second hydraulic cylinder, but was also required to maintain the alignment of the first portion of the forming tool set relative to the second portion of the forming tool set. Accordingly, the size and weight of the prior hydraulic presses have been necessarily substantial. Since the size and weight of the prior hydraulic presses were substantial, the gross volume of hydraulic fluid required for the prior hydraulic presses were also substantial. Accordingly, the size and volume of the hydraulic pumps for pumping the hydraulic fluid needed to be correspondingly increased in size and volume.

The substantial weight and size of the prior art hydraulic presses have necessitated the building of reinforced concrete bases for permanently mounting the hydraulic presses. When multiple rams were used for applying pressure to both the first and the second portion of the forming tool set, the total length of the external frame had to be extended to accommodate for the strokes of the plural rams. In some cases, a pit was fabricated to receive one of the hydraulic cylinders in an effort to lower the overall height of the plural hydraulic cylinder press. The lowering of the overall height of the plural hydraulic cylinder press was necessary in some cases in order to keep the height of the hydraulic press within suitable limits. The lowering of the overall height of the plural hydraulic cylinder press also facilitated the introduction of the material into the forming tool set and facilitated the removal of the formed object from the forming tool set by lowering the forming tool set to a proper height for an operator.

Another disadvantage of these prior art hydraulic presses were the required size and weight as well as the precision construction and mounting of the forming tool set. Since the forming tool set was aligned by corner posts of the external frame, forming tool mounts were required to be excessively large in order to span the width of the external frame to align the forming tool set thereby. The excessively large size of the forming tool set not only added to the cost of fabricating the forming tool set but also added substantially to the weight of the overall hydraulic press.

Therefore it is an object of this invention to provide an improved press for pressing a compressible material that is substantially smaller in size, weight and cost than heretofore known in the art.

Another object of this invention is to provide an improved press for pressing a compressible material wherein a unitary hydraulic cylinder provides a structural support for either a single hydraulic piston or multiple hydraulic pistons.

Another object of this invention is to provide an improved press for pressing a compressible material wherein the press can either utilize a single hydraulic cylinder press or a multiple hydraulic cylinder press.

Another object of this invention is to provide an improved press for pressing a compressible material wherein a unitary hydraulic cylinder bore receives either a single hydraulic piston or multiple hydraulic pistons.

Another object of this invention is to provide an improved press for pressing a compressible material wherein a unitary hydraulic cylinder bore receives either a single slidable forming tool set or multiple slidable forming tools.

Another object of this invention is to provide an improved press for pressing a compressible material wherein either a single slidable forming tool set or multiple slidable forming tool set disposed within a unitary hydraulic cylinder bore may be more readily installed or removed.

Another object of this invention is to provide an improved press for pressing a compressible material wherein the forming tool set may be lighter in weight and smaller in dimension than heretofore known in the art without the sacrifice of mechanical strength or mechanical alignment.

Another object of this invention is to provide an improved press for pressing a compressible material that provides a precision movement between a first and a second forming tool set heretofore unknown in the prior art.

Another object of this invention is to provide an improved hydraulic press wherein a single or multiple hydraulic pistons and a single or multiple slidable forming tool set is disposed in a unitary hydraulic bore wherein the hydraulic cylinder provides the structure for the improved hydraulic press.

Another object of this invention is to provide an improved hydraulic press which is capable of providing substantial hydraulic pressure to form an object with a precision heretofore unknown in the prior art.

Another object of this invention is to provide an improved hydraulic press which requires less gross hydraulic fluid for operation relative to the hydraulic presses heretofore known in the prior art.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with a specific embodiment being shown in the attached drawings. For the purpose of summarizing the invention, the invention relates to an improved press for pressing a compressible material with a fluid under pressure from a fluid pressure source. The improved press comprises a press cylinder having a press cylinder bore with a sleeve defining a sleeve bore disposed within the press cylinder bore. The sleeve bore is adapted to receive the compressible material between forming tool means. Pressure is applied from the fluid pressure source to the forming tool means for moving the forming tool means to press the compressible material therebetween.

In a more specific embodiment of the invention, the retaining means comprises interlocking means for removably retaining the sleeve within the press cylinder bore. Preferably, closure means removably closes the press cylinder bore with the pressure means. Pressure port means applied the fluid under pressure from the fluid pressure source to move the forming tool means to press the compressible material therebetween.

In one embodiment of the invention, driver plate means is slidably disposed within the press cylinder bore for cooperating with the forming tool means. The closure means removably interlocks with the press cylinder for closing the press cylinder bore. The driver plate means defines an outer fluid volume means between the driver plate means and the closure means and defines an inner fluid volume means between the driver plate means and the sleeve. Vacuum port means interconnects the inner fluid volume means with a source of vacuum for evacuating the sleeved bore and the compressible material therein. The pressure means includes pressure port means communicating with the outer fluid volume means for applying pressure to the driver plate means to move the forming tool means.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
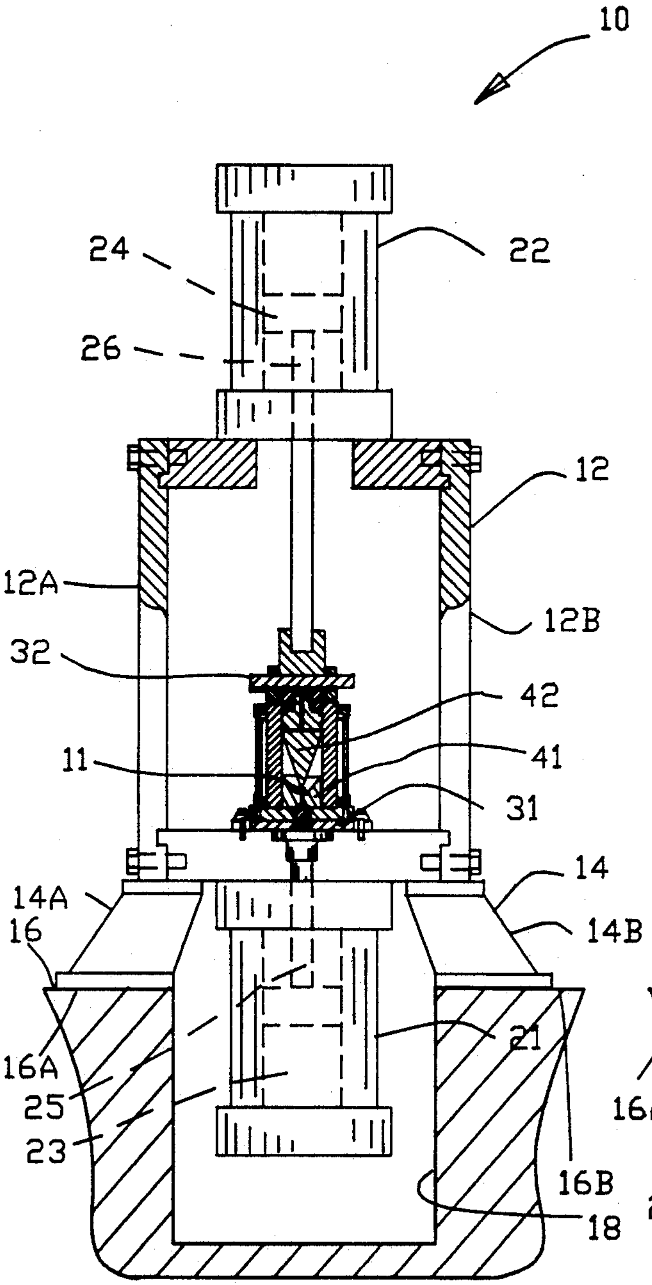
FIG. 1 is a front elevational view partially in section of a prior art press in an open position.
Figure 2:
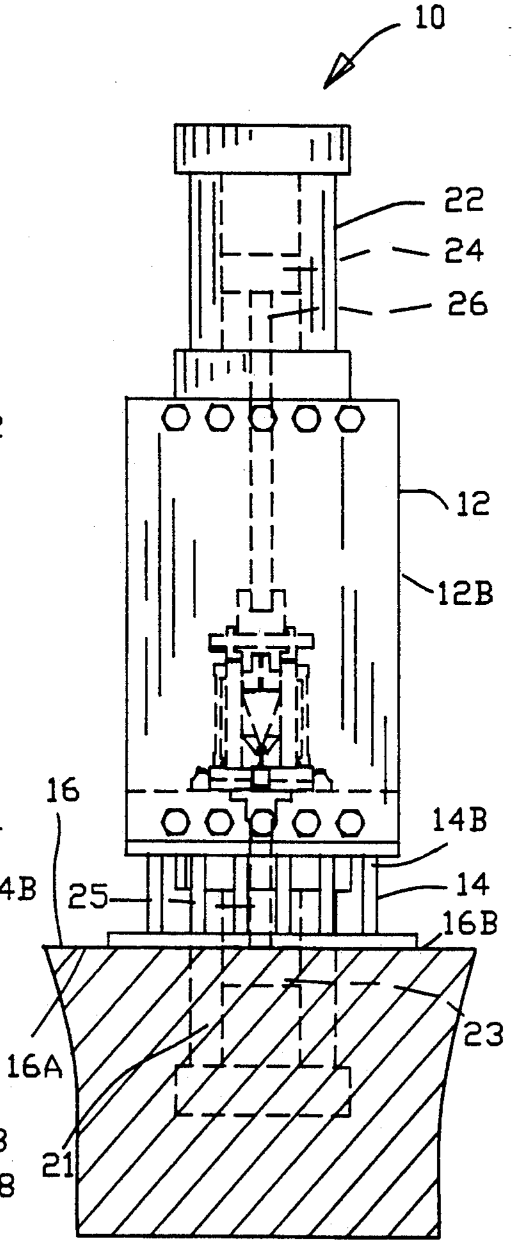
FIG. 2 is a side view of the prior art press of FIG. 1.
Figure 3:
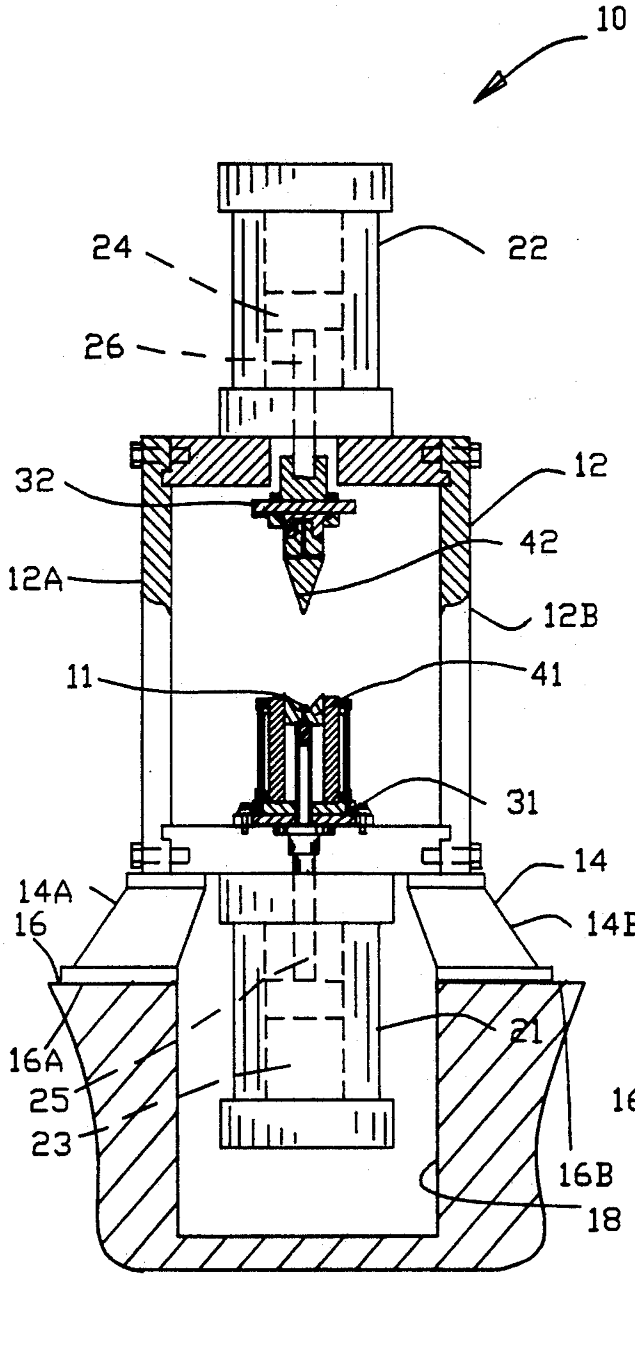
FIG. 3 is a front elevational view partially in section of the prior art press of FIG. 1 in a closed position.
Figure 4:
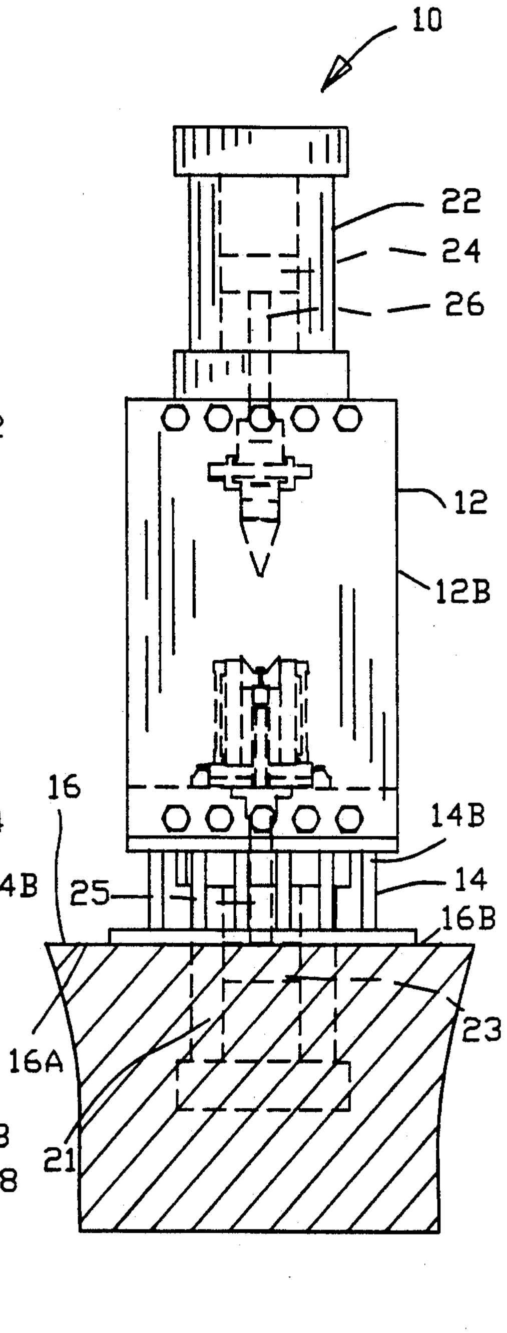
FIG. 4 is a side view of the prior art press of FIG. 3.

FIGS. 1 and 2 illustrate a hydraulic press 10 in an open position for compressing a material 11 constructed in accordance with the prior art practice. FIGS. 3 and 4 illustrate the hydraulic press 10 of FIGS. 1 and 2 in a closed position. The hydraulic press 10 comprises an external frame 12 comprising frame elements 12A and 12B supported by a legs 14 comprising base legs 14A and 14B resting on a concrete slab 16. The concrete slab 16 is provided with a pit 18 having peripheral edges 16A and 16B for supporting base legs 14A and 14B. Typically, the concrete slab 16 is constructed of a reinforced concrete for supporting the massive weight of the prior art hydraulic press 10.

The external frame 12 supports a lower and an upper hydraulic cylinder 21 and 22. The lower hydraulic cylinder 21 and the upper hydraulic cylinder 22 are secured to the external frame 12 within the frame elements 12A and 12B. The lower and upper hydraulic cylinders 21 and 22 include a lower and an upper hydraulic piston 23 and 24 connected to a lower and an upper hydraulic ram 25 and 26. A lower and an upper mounting 31 and 32 support a lower and upper forming tool 41 and 42 to be slidably disposed within the frame elements 12A and 12B of the external frame 12. The lower and upper mountings 31 and 32 are respectively connected to the lower and upper hydraulic rams 25 and 26 for moving the lower and upper forming tool 41 and 42.

During the operation of this prior art hydraulic press 10, the material 11 to be formed is placed between the lower and upper forming tools 41 and 42 as shown in FIGS. 1 and 2. A hydraulic pressure is applied to the lower and upper hydraulic cylinders 21 and 22. The lower and upper hydraulic cylinders 21 and 22 move the lower and upper hydraulic pistons 23 and 24 and the lower and upper hydraulic rams 25 and 26 towards one another as shown in FIGS. 3 and 4. The lower and upper forming tools 41 and 42 are moved towards one another to form the material 11 therebetween.

In many instances, an extremely high pressure is required for the proper forming of the material 11. Accordingly, the pressures applied by the lower and upper hydraulic cylinders 21 and 22 must be extremely high to enable the combined pressure of the lower and upper forming tools 41 and 42 to be sufficient to form the material 11.

To accommodate an extremely high pressure between the lower and upper forming tools 41 and 42, the external frame 12 and the lower and upper hydraulic cylinders 21 and 22 must be of massive steel construction to inhibit the flexing or deformation of the external frame 12 and/or the lower and upper hydraulic cylinders 21 and 22 upon the application of the extreme hydraulic pressure. Any deflection within the external frame 12 and/or the lower and upper hydraulic cylinders 21 and 22 may cause a misalignment between the lower and upper forming tools 41 and 42. Any misalignment between the lower and upper forming tools 41 and 42 will result in an inaccurately formed material 11. Furthermore, since at least one of the lower and upper forming tools 41 and 42 is slidably interconnected within the external frame 12 as illustrated by the lower mounting 31 and the upper mounting 32, the forming tools 41 and 42 must be massive to span the expanse between the frame elements 12A and 12B of the external frame 12. Accordingly, the cost of machining very massive lower and upper forming tools 41 and 42, in some instances, prohibited the construction of prototype or test forming tools for testing new products with new shapes and/or new materials to be formed.

The massive weight of the external frame 12, the lower and upper hydraulic cylinders 21 and 22, the lower and upper mountings 31 and 32, the lower and upper forming tools 41 and 42 in addition to the massive weight of the base 14 required the concrete slab 16 to be of massive construction. Furthermore, the massive construction and the use of the lower and upper hydraulic cylinders 21 and 22 in many instances required the pit 18 to be utilized in order to reduce the overall height of the prior art hydraulic press 10 in order to be used in conventional buildings having conventional ceiling heights. The construction of the pit 18 was further complicated and made more expensive by the fact that the peripheral edges 18A and 18B of the pit 18 was required to be substantially reinforced in order to support the weight of the base legs 14A and 14B of the base 14. In addition, the pit 18 made the maintenance and servicing of the lower hydraulic cylinder 22 cumbersome and inaccessible to maintenance personnel. The aforementioned disadvantages have been overcome by the improved press of the present invention which will be described in greater detail hereinafter.

Figure 5:
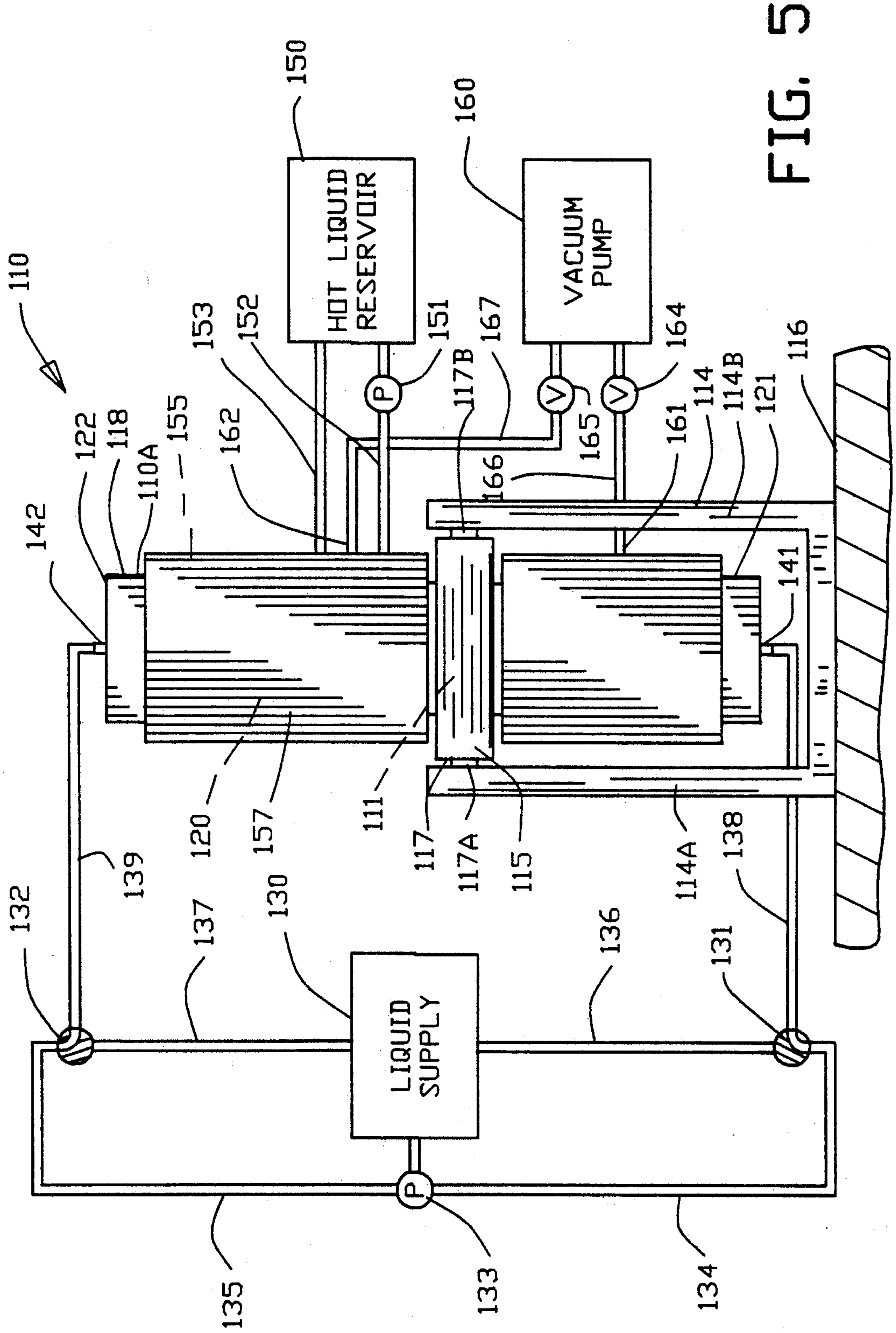
FIG. 5 is a front elevational view of the improved press of the present invention connected to a fluid pressure source and a source of vacuum.
Figure 6:
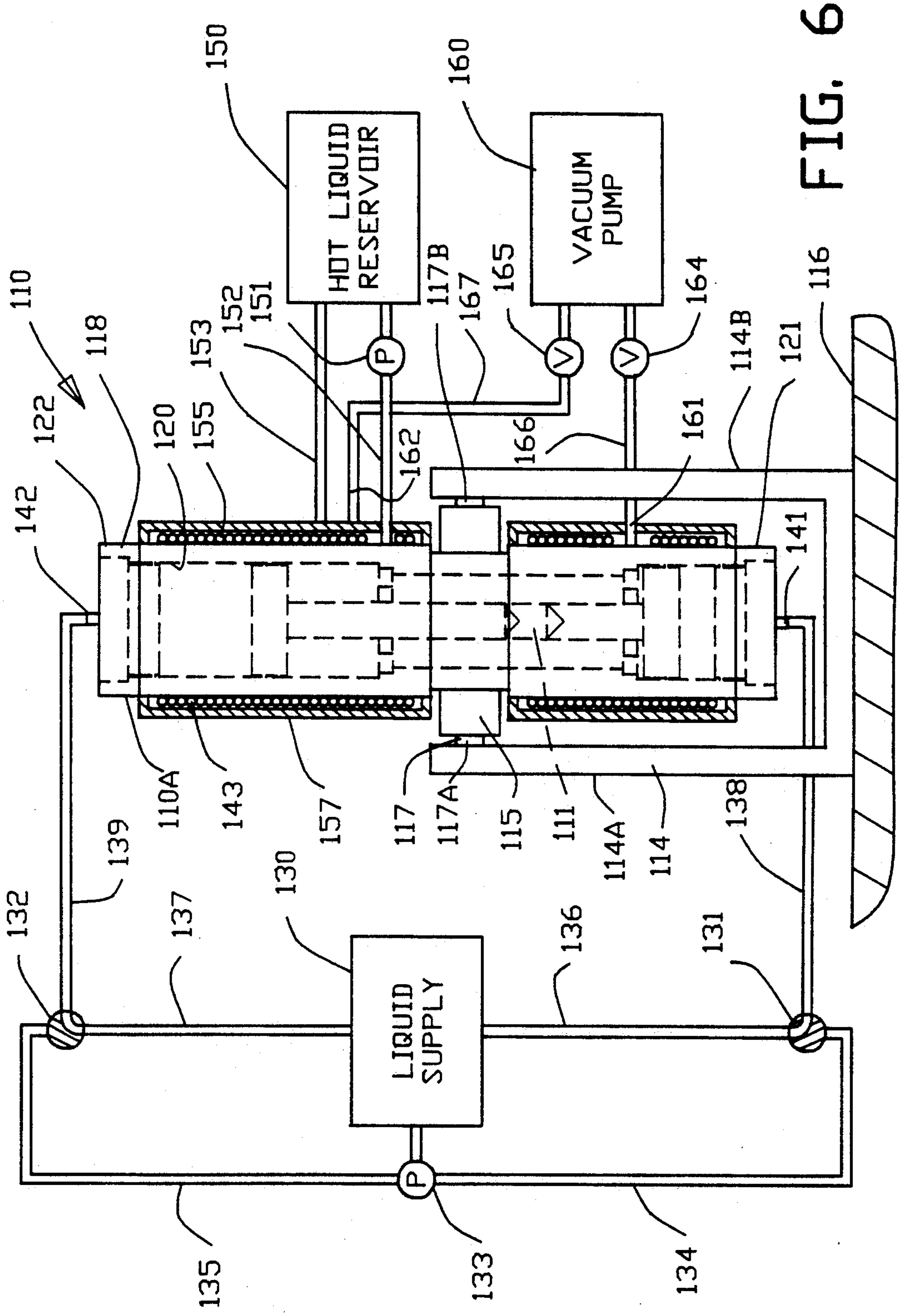
FIG. 6 is a front elevational view similar to FIG. 5 with the improved press being shown in section.

FIGS. 5 and 6 illustrate the improved press 110 constructed in accordance with the present invention for pressing a material 111. The improved press 110 comprises a base 114 having base arms 114A and 114B cooperating with a mounting ring 115 disposed about an outer surface 110A of the improved press 110 for supporting the improved press 110 relative to a concrete slab 116. In this embodiment, the improved press 110 comprises pivot means 117 including a first and a second pivot 117A and 117B cooperating with the first and second base arms 114A and 114B. The pivot means 117 enables rotation of the improved press 110 relative to the base 14. The improved press 110 has a press cylinder 118 defining a press cylinder bore 120 extending between a first end 121 and a second end 122 of the press cylinder 118.

A fluid pressure source comprises a liquid supply 130, a first and a second valve 131 and 132, a pump 133 and conduits 134–139. The first and second valves 131 and 132 are shown as three-way valves. The liquid supply 130 is connected through the pump 133 and conduits 134 and 135 to the first and second valves 131 and 132, respectively. Conduits 136 and 137 are connected between the first and second valves 131 and 132 and the liquid supply 130. The first and second valves 131 and 132 are connected through conduits 138 and 139 to a first and a second pressure port 141 and 142 communicating with the first and second ends 121 and 122 of the press cylinder 118. When the first and second valves 131 and 132 are in the position shown in FIG. 5, the pump 133 provides fluid under pressure from the liquid supply 130 through conduits 138 and 139 to the first and second ends 121 and 122 of the press cylinder 118. When the first and second valves 131 and 132 are in the position shown in FIG. 6, conduits 136–139 provide returns for the fluid from the first and second ends 121 and 122 of the press cylinder 118 to the liquid supply 130.

A hot liquid reservoir 150 is connected through a pump 151 and conduits 152 and 153 to heating means shown as heating coils 155 in thermal contact with the outer surface 110A of the press cylinder 118. A heated liquid is circulated from the hot liquid reservoir 150 through the coils 155 to provide heat to the improved press 110. Preferably, insulation means 157 overlies the heating coils 155 for enabling the heat to be directed to the compressible material 111 internal the press cylinder bore 120.

A vacuum pump 160 is connected to a first and a second vacuum port 161 and 162 communicating with the first and second ends 121 and 122 of the press cylinder bore 120 through valves 164 and 165 and conduits 166 and 167. The vacuum pump 160 evacuates the press cylinder bore 120 prior to the pressing process as will be described in greater detail hereinafter.

Figure 7:
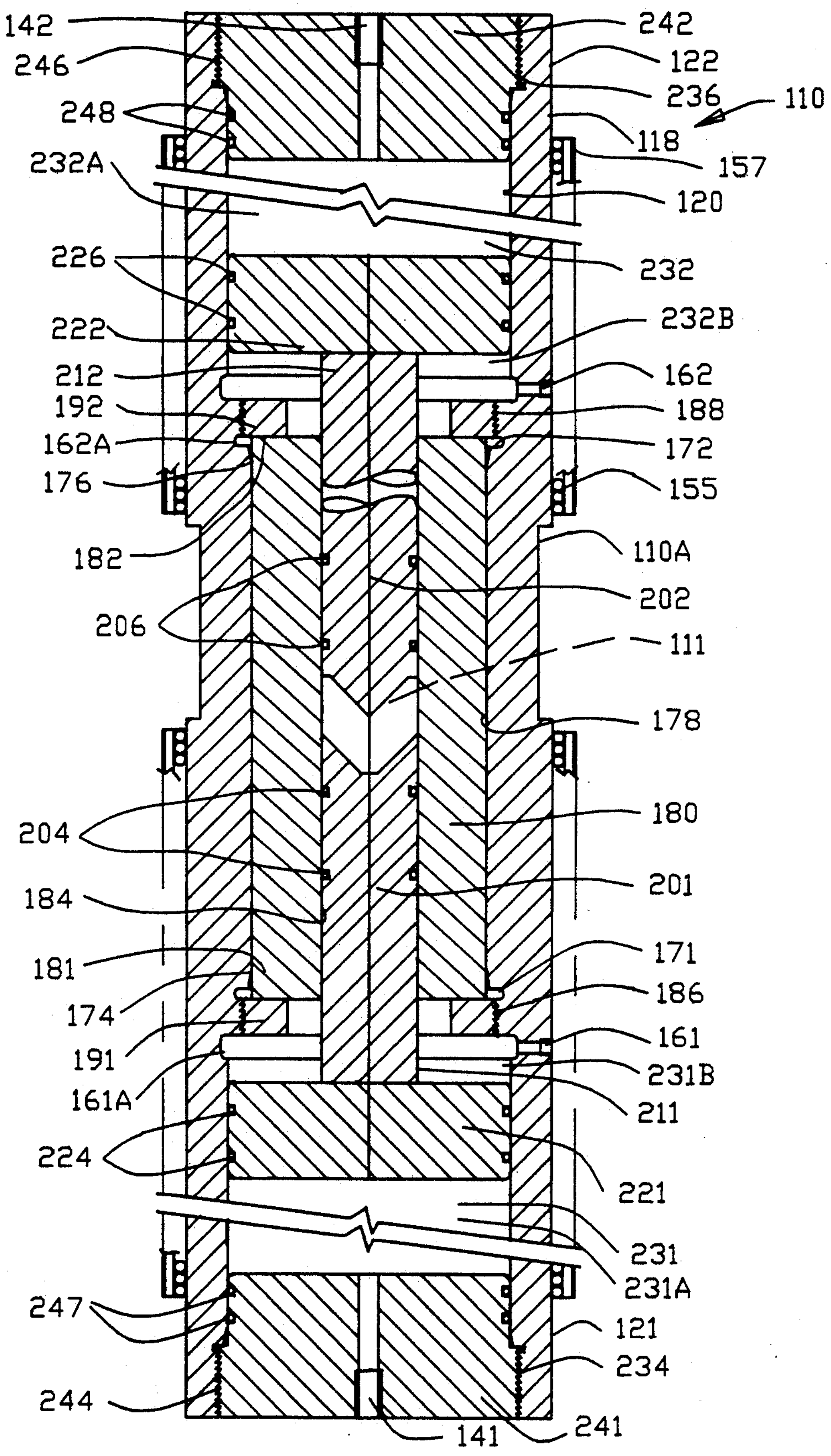
FIG. 7 is an enlarged sectional view of the improved press shown in FIG. 6.

FIG. 7 illustrates in greater detail the press cylinder 118 with the press cylinder bore 120 defining a first and second shoulder 171 and 172 on opposed first and second ends 174 and 176 of an intermediate bore 178. The intermediate bore 178 has less of a diameter than the press cylinder bore 120.

A sleeve 180 having a first and a second end 181 and 182 defines a sleeve bore 184 having a diameter which is less than the intermediate bore 178. The sleeve 180 is disposed within the intermediate bore 178 and is secured to the press cylinder bore 120 by suitable means. In this example, first and second threads 186 and 188 are defined in the press cylinder bore 120 for threadably receiving threaded first and second locking rings 191 and 192. The first and second locking rings 191 and 192 engage the first and second ends 181 and 182 of the sleeve 180 for securing the sleeve 180 relative to the press cylinder 118. Although the sleeve 180 has been shown being secured to the press cylinder 118 with the first and second locking rings 191 and 192 as heretofore described, it should be appreciated by those skilled in the art that numerous means may be used to secure the sleeve 180 to the press cylinder 118.

A first and a second forming tool 201 and 202 is slidably disposed within the sleeve bore 184 with a first and a second plurality of O-ring seals 204 and 206 sealing the first and second forming tools 201 and 202 relative to the sleeve bore 184. The material 111 to be compressed is disposed within the sleeve bore 184 between the first and second forming tools 201 and 202. The first and second forming tools 201 and 202 extend outwardly beyond the first and second ends 181 and 182 of the sleeve 180 such that the distal ends 211 and 212 of the first and second forming tools 201 and 202 engage a first and a second driver plate 221 and 222.

The first and second driver plates 221 and 222 include a first and a second plurality of O-ring seals 224 and 226. The first and second driver plates 221 and 222 are slidably disposed within a first cylinder bore portion 231 and a second cylinder bore portion 232 of the press cylinder bore 120. The first and second plurality of O-ring seals 224 and 226 seal the first and second driver plates 221 and 222 relative to the first and second cylinder bore portions 231 and 232 of the press cylinder bore 120. First and second threads 234 and 236 are defined in the first and second cylinder bore portions 231 and 232 of the press cylinder bore 120.

A first and a second closure 241 and 242 are secured to the first and second ends 121 and 122 of the press cylinder 118 for closing the press cylinder bore 120. In this embodiment, the first and second threads 244 and 246 are defined on the first and second closures 241 and 242 for threadably engaging with the threads 234 and 236 defined in the first and second cylinder bore portions 231 and 232 of the press cylinder bore 120 for securing the first and second closures 241 and 242 relative to the press cylinder 118. A first and a second plurality of O-ring seals 247 and 248 seal the first and second closures 241 and 242 relative to the first and second cylinder bore portions 231 and 232 of the press cylinder bore 120. In this embodiment, the first and second pressure ports 141 and 142 are defined within the first and second closures 241 and 242 but it should be understood that the pressure ports may be defined within the sidewall of the press cylinder 118.

The first driver plate 221 separates the first cylinder bore portion 231 into an outer fluid volume 231A between the first driver plate 221 and the first closure 241 and an inner fluid volume 231B between the first driver plate 221 and the first end 181 of the sleeve 180. In a similar manner, the second driver plate 222 separates the second cylinder bore portion 232 into an outer fluid volume 232A between the second driver plate 222 and the second closure 242 and an inner fluid volume 232B between the second driver plate 222 and the second end 182 of the sleeve 180.

The first and second vacuum ports 161 and 162 defined within the sidewall of the press cylinder 118 communicate with first and second annular reliefs 161A and 162A disposed within the inner fluid volumes 231B and 232B. The first and second vacuum ports 161 and 162 are adapted to evacuate the inner fluid volumes 231B and 232B and the material 111 disposed within the sleeve bore 184. In a similar manner, the first and second pressure ports 141 and 142 defined in the first and second closures 241 and 242 communicate with the outer fluid volumes 231B and 232B for applying pressure to the first and second driver plate 241 and 242 to move the first and second forming tools 201 and 202.

Figure 8:
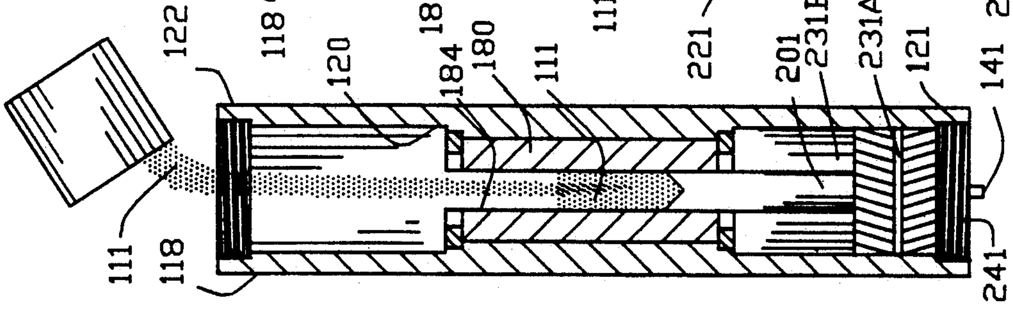
FIG. 8 is a sectional view of the improved press illustrating a first method step of placing a compressible material into the improved press.

FIGS. 8-12 illustrate the steps of utilizing the improved press 110 for compressing the compressible material 111. FIG. 8 illustrates the sleeve 180 disposed within the press cylinder bore 120 with the first forming tool 201, the first driver plate 221, and the first closure 241 being installed within the press cylinder bore 120. The compressible material 111 is shown being introduced into the sleeve bore 184. Optionally, the improved press 110 may be preheated with hot liquid circulated between the hot liquid reservoir 150 and the heating coils 155 by pump 151 and conduits 152 and 153 as shown in FIGS. 5 and 6.

Figure 9:
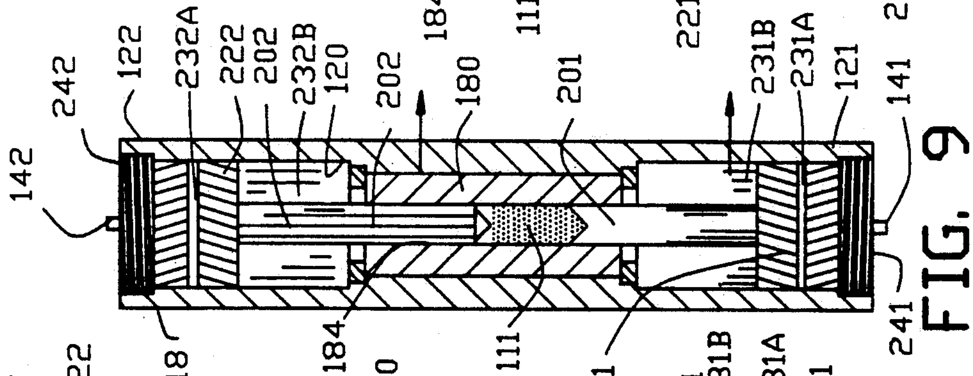
FIG. 9 is a sectional view of the improved press illustrating a second and a third method step of closing a first and a second end of the press cylinder and evacuating the improved press and the compressible material.

FIG. 9 illustrates the insertion of the second forming tool 202, the second driver plate 222 and the second closure 242 for sealing the press cylinder bore 184. After insertion of the second forming tool 202, the second driver plate 222 and the second closure 242, the valve 164 and 165 shown in FIGS. 5 and 6 are opened for enabling the vacuum pump 160 to evacuate the first and second inner fluid volumes 231B and 232B, the sleeve bore 184 and material 111 through the first and second vacuum ports 161 and 162 as indicated by the arrows in FIG. 9.

Figure 10:
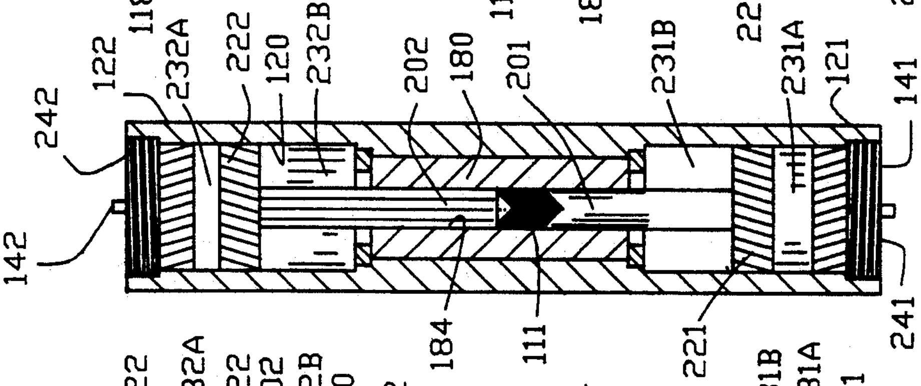
FIG. 10 is a sectional view of the improved press illustrating a fourth method step of simultaneously moving a first and a second forming tool set toward one another to press the compressible material.

FIG. 10 illustrates the application of fluid pressure through the first and second pressure ports 141 and 142 from the source of liquid supply 130. The first and second valves 131 and 132 are moved into the position shown in FIG. 5 for enabling pump 133 to provide fluid from the liquid supply 130 under pressure through conduits 134 and 138 and conduits 135 and 139 into the first and second outer fluid volumes 231A and 232A. The fluid pressure in the outer fluid volumes 231A and 232A move the first and second driver plates 221 and 222 toward one another thereby compressing the material 111 between the first and second forming tools 201 and 202.

Upon completion of the application of the proper pressure to the material 111, the first and second valves 131 and 132 are moved to the position shown in FIG. 6 for enabling fluid from the first and second outer fluid volumes 231A and 232A to flow through conduits 138 and 136 and conduits 139 and 137 into the liquid supply 130 to remove the pressure for the first and second driver plates 221 and 222.

Figure 11:
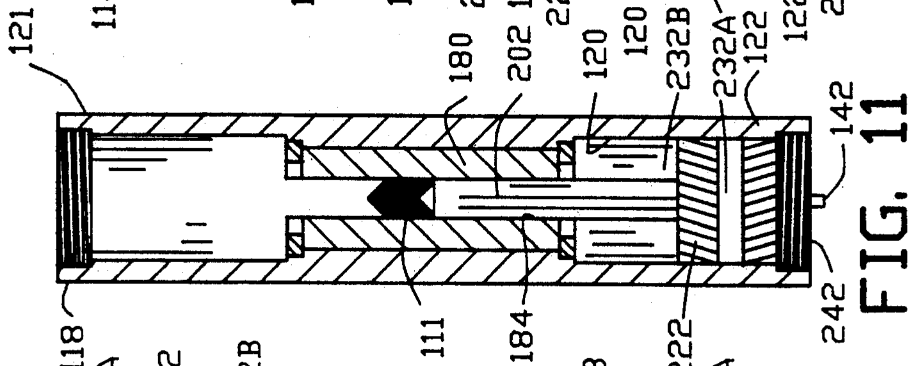
FIG. 11 is a sectional view of the improved press illustrating a fifth method step of removing the first forming tool and a sixth method step of pivoting the improved press.

FIG. 11 illustrates the pressed cylinder 118 after rotation about the pivot means 117 and the cessation of operation of the vacuum pump 160. The first closure 241, the first driver plate 221 and the first forming tool 201 have been removed from the press cylinder bore 120.

Figure 12:
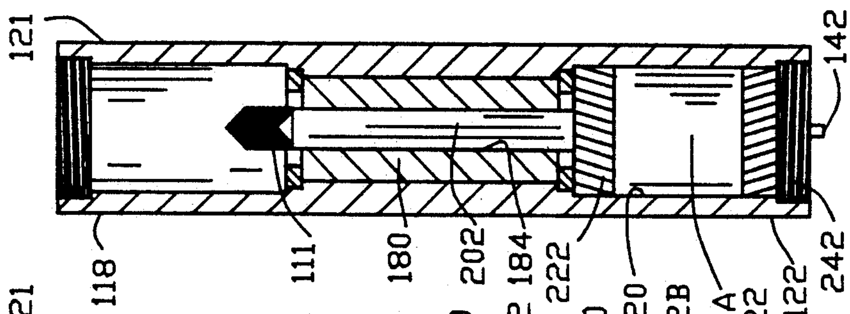
FIG. 12 is a sectional view of the improved press illustrating a seventh method step of moving the second forming tool to remove the compressed material.

FIG. 12 illustrates the application of a moderate fluid pressure to the second outer fluid volume 232A for moving the second forming tool 202 upwardly in FIG. 12 to expose the formed material 111 external the sleeve bore 184 and into the cylinder bore 120. The moderate fluid pressure applied to the second outer fluid volume 232A is accomplished by partially moving the second valve 132 to the position shown in FIG. 5 for enabling pump 133 to provide moderate volume of fluid from the liquid supply 130 through conduits 135 and 139 into the second outer fluid volume 232A. Thereafter, the formed material 111 can be removed from the improved press 110. Although the improved press 110 of the present invention has been illustrated with plural driver plates 221 and 222, the present invention is equally suitable for use with a single driver plate 221 as should be appreciated by those skilled in the art.

An important aspect of the present invention is the elimination of the external frame 12 of the prior art press 10 shown in FIGS. 1–4. In the improved press 110 of the present invention, the press cylinder 118 provides multiple functions through the use of a single press cylinder bore 120. The single press cylinder bore 120 receives and supports the sleeve 180, the first and second forming tools 201 and 202, as well as the first and second driver plates 221 and 222. Since the improved press 110 totally eliminates the external frame 12 of the prior art press 10, the total diameter of the improved press 110 is dramatically reduced. Typically, the total diameter of the improved press 110 is equivalent to the diameter of the hydraulic cylinders 21 and 22 of the prior art press 10.

Another important aspect of the present invention is the reduction of the gross volume of hydraulic fluid required for the first and second outer fluid volumes 231A and 232A relative to the prior art hydraulic press shown in FIGS. 1–4. Accordingly, the size and volume of the pump 133 for providing fluid from the liquid supply 130 to the first and second outer fluid volumes 231A and 232A can be correspondingly reduced in size and volume relative to the prior art hydraulic press shown in FIGS. 1–4.

The use of a single press cylinder bore 120 to support the sleeve 180, the first and second forming tools 201 and 202 and the first and second driver plates 221 and 222, dramatically reduces the total height of the improved press 110 relative to the prior art press 10. Typically, the total length of the improved press 110 can be reduced from the prior art press 10 to eliminate the need for the pit 18 shown in FIGS. 1–2. The smaller dimensions of the improved press 110 relative to the prior art press 10, allow all machining to be held to higher tolerances and greater accuracy for the same or similar size part.

The single press cylinder bore 120 also provides a single guide for the sleeve 180, the first and second forming tools 201 and 202 and the first and second driver plates 221 and 222 resulting in a more accurate alignment of the first and second forming tools 201 and 202. Deflection or misalignment of the forming tools 201 and 202 is essentially eliminated through the use of the concentric sleeve bore 184 disposed within the intermediate cylinder bore 178.

The reduction of the diameter and the length of the improved press 110 and the elimination of the external frame 12 further allows the improved press 110 to be rotatable about pivots 117. A rotatable improved press 110 facilitates removal of the formed material 111 as well as facilitating assembly and maintenance.

Furthermore, since the sleeve 180 is removable from the improved press 110, only the sleeve 180 and the first and second forming tools 201 and 202 need be machined for forming a new shape of compressed material 111. Accordingly, extensive machining is not required for prototype or test forming tools for testing new products with new shapes and/or new materials to be formed.

Figure 13:
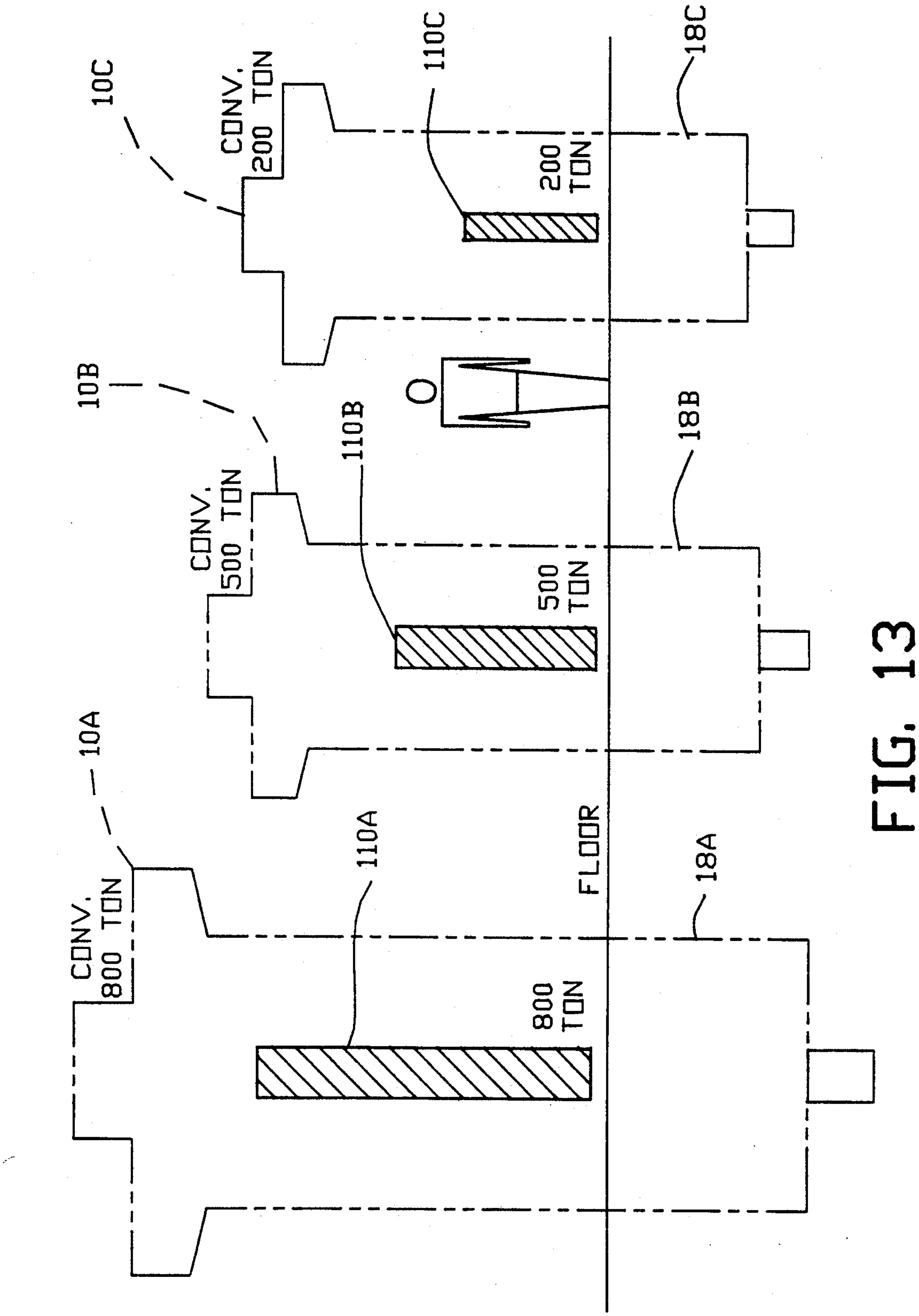
FIG. 13 is a diagram illustrating the effectiveness of the improved press of the present invention relative to prior art press of FIG. 1.

FIG. 13 is a graphical representation of the size and weight of the prior press 10 of FIGS. 1–4 in contrast to the size and weight of the improved press 110 of the present invention having a corresponding capacity. The hydraulic presses 10A, 10B and 10C shown in phantom represent prior art hydraulic presses with a capacity of 800 tons, 500 tons and 200 tons, respectively. The presses 110A, 110B and 110C represent the improved press of the present invention having an equivalent capacity of 800 tons, 500 tons and 200 tons, respectively. The improved presses 110A, 110B and 110C of the present invention are typically less than one-half the length and one-seventh the diameter of the prior art presses 10A, 10B and 10C. The improved presses 110A, 110B and 110C result in a substantial reduction in weight over the prior art presses 10A, 10B and 10C and do not require the pit 18 for a press capacity of 800 tons.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved press for pressing a compressible material with a fluid under pressure from a fluid pressure source, comprising in combination:

a press cylinder having a press cylinder bore extending between a first end and a second end of said press cylinder;

said press cylinder bore having a first and a second end portion and an intermediate portion disposed between said first and second end portions;

said press cylinder bore having a cylinder bore surface defining a cross-sectional area of said press cylinder bore;

said press cylinder having a sleeve portion located within said intermediate portion of said press cylinder bore;

said sleeve portion defining a sleeve bore with said sleeve bore having a cross-sectional area smaller than said cross-sectional area of said press cylinder bore;

forming tool means comprising a first and a second forming tool for extending into said sleeve bore;

driver plate means having a cross-sectional area for slidably engaging with said cylinder bore surface of said press cylinder bore;

a first and a second closure for removably closing said first and second ends of said press cylinder;

said sleeve bore receiving the compressible material between said first and second forming tools;

pressure means for applying the fluid under pressure from the fluid pressure source to said driver plate means for moving said driver plate means into contact with said forming tool means to press the compressible material between said first and second forming tools; and said forming tool means pressing the compressible material with an enhanced pressure in accordance with said smaller cross-sectional area of said sleeve bore relative to said press cylinder bore.

2. An improved press as set forth in claim 1, wherein said sleeve portion comprises a sleeve engaging said press cylinder bore; and retaining means comprising interlocking means for simultaneously engaging said press cylinder bore and said sleeve for removably retaining said sleeve within said press cylinder bore.

3. An improved press as set forth in claim 1, wherein said pressure means includes pressure port means for applying the fluid under pressure from the fluid pressure source to move said forming tool means to press the compressible material therebetween.

4. An improved press as set forth in claim 1, wherein said driver plate means defines outer fluid volume means between said driver plate means and said closure means and defines inner fluid volume means between said driver plate means and said sleeve;

vacuum port means interconnecting said inner fluid volume means with a source of vacuum for evacuating said sleeve bore and the compressible material therein; and said pressure means including pressure port means communicating with said outer fluid volume means for applying pressure to said driver plate means to move said forming tool means.

5. An improved press for compressing a compressible material with a fluid under pressure from a fluid pressure source, comprising in combination:

a press cylinder having a press cylinder bore extending between a first end and a second end of said press cylinder;

said press cylinder bore having a cylinder bore surface defining a cross-sectional area of said press cylinder bore;

a sleeve defining a sleeve bore extending between a first end and a second end of said sleeve with said sleeve bore having a cross-sectional area smaller than said cross-sectional area of said press cylinder bore;

retaining means for removably retaining said sleeve within said press cylinder bore intermediate said first and second ends of said press cylinder;

a first and a second forming tool respectively extending into said sleeve bore from said first end and said second end of said sleeve bore;

said sleeve bore receiving the compressible material between said first and second forming tools;

a first and a second driver plate each having a cross-sectional area for slidably engaging with said cylinder bore surface at said first and second ends of said press cylinder bore;

a first and a second closure for removably closing said first and second ends of said press cylinder;

pressure means for simultaneously applying the fluid under pressure from the fluid pressure source to said first driver plate and said second driver plate for simultaneously moving said first forming tool and said second forming tool toward one another to press the compressible material between said first and second forming tools; and said forming tool means pressing the compressible material with an enhanced pressure in accordance with said smaller cross-sectional area of said sleeve bore relative to said press cylinder bore.

6. An improved press as set forth in claim 5, including heating means for heating the compressible material internal said sleeve bore.

7. An improved press as set forth in claim 5, including heating means disposed adjacent an outer surface of said press cylinder for heating the compressible material internal said sleeve bore; and insulation means overlying said heating means.

8. An improved press as set forth in claim 5, wherein said retaining means comprises a first and a second locking ring for interlocking with said press cylinder bore and for simultaneously engaging with said first and said second ends of said sleeve for removably retaining said sleeve within said press cylinder bore.

9. An improved press as set forth in claim 5, wherein said retaining means comprises a first and a second threaded locking ring for threadably engaging with said press cylinder bore and for simultaneously engaging with said first and said second ends of said sleeve for removably retaining said sleeve within said press cylinder bore.

10. an improved press as set forth in claim 5, wherein said pressure means includes a first and a second pressure port for applying the fluid under pressure from the fluid pressure source to move said first and second forming tools toward one another to compress the compressible material therebetween.

11. An improved press as set forth in claim 5, wherein said first driver plate and said first closure defines a first outer fluid volume in said press cylinder bore;

said second driver plate and said second closure defining a second outer fluid volume in said press cylinder bore; and said pressure means including a first and a second pressure port communicating with said first and second outer fluid volumes for applying pressure to said first and second driver plates to move said first and second forming tools.

12. An improved press as set forth in claim 5, wherein said first driver plate and said first closure defines a first outer fluid volume in said press cylinder bore;

said first driver plate and said first end of said sleeve defining a first inner fluid volume in said press cylinder bore;

said second driver plate and said second closure defining a second outer fluid volume in said press cylinder bore; and said second driver plate and said second end of said sleeve defining a second inner fluid volume in said press cylinder bore;

a first and a second vacuum port interconnecting said first and said second inner fluid volumes with a source of vacuum for evacuating said sleeve bore and the compressible material therein; and said pressure means including a first and a second pressure port communicating with said first and second outer fluid volumes for applying pressure to said first and second driver plates to move said first and second forming tools.

13. An improved press as set forth in claim 5, including valve means for individually applying the fluid under pressure from the fluid pressure source to each of said first and second driver plates.

14. An improved press as set forth in claim 5, including press pivot means disposed relative to said press cylinder;

support pivot means disposed relative to a support for pivotably supporting said press cylinder relative to said support.

15. An improved press for pressing a compressible material with a fluid under pressure from a fluid pressure source, comprising in combination:

a press cylinder having a press cylinder bore extending between a first end and a second end of said press cylinder;

said press cylinder bore having a first and second end portion and an intermediate portion disposed between said first and second end portions;

said first and second end portions of said press cylinder bore having a first and a second cylinder bore surface defining a cross-sectional area of said press cylinder bore;

a sleeve defining a sleeve bore extending between a first end and a second end of said sleeve with said sleeve bore having a cross-sectional area smaller than said cross-sectional area of said press cylinder bore;

retaining means for removably retaining said sleeve within said intermediate portion of said press cylinder bore;

a first and a second forming tool extending into said sleeve bore from said first and second ends of said sleeve bore;

said sleeve bore receiving the compressible material between said first and second forming tools;

a first and a second driver plate each having a cross-sectional area for slidably engaging said first and second cylinder bore surfaces of said first end portion and said second end portion of said press cylinder bore;

a first and a second closure for sealing said first and second ends of said press cylinder bore to define a first outer fluid volume between said first driver plate and said first closure and define a second outer fluid volume between said second driver plate and said second closure; and pressure means for simultaneously applying the fluid under pressure from the fluid pressure source into said first and second outer fluid volumes to act upon said first and said second driver plates for moving said first and second driver plates into contact with said first and second forming tools toward one another to press the compressible material therebetween.

16. An improved press as set forth in claim 15, including heating means for heating an outer surface of said press cylinder to heat the compressible material internal said sleeve bore.

17. An improved press as set forth in claim 15, including heating means disposed adjacent an outer surface of said press cylinder to heat the compressible material internal said sleeve bore; and insulation means overlying said heating means.

18. An improved press for pressing a compressible material with a fluid under pressure from a fluid pressure source, comprising in combination;

a press cylinder having a press cylinder bore extending between a first end and a second end of said press cylinder;

said press cylinder bore having a first and second end portion and an intermediate portion disposed between said first and second end portions;

a sleeve defining a sleeve bore extending between a first end and a second end of said sleeve;

said sleeve bore receiving the compressible material therein;

retaining means for removably retaining said sleeve within said intermediate portion of said press cylinder bore;

a first and a second forming tool extending into said sleeve bore from said first and second ends of said sleeve bore;

a first and a second driver plate slidably disposed with said first end portion and said second end portion of said press cylinder bore for cooperating with said first and second forming tools;

a first and a second closure for sealing said first and second ends of said press cylinder bore to define a first outer fluid volume between said first driver plate and said first closure and define a second outer fluid volume between said second driver plate and said second closure;

pressure means for simultaneously applying the fluid under pressure from the fluid pressure source into said first and second outer fluid volumes to act upon said first and said second driver plates for moving said first and second forming tools toward one another to press the compressible material therebetween;

said first and second end portions of said press cylinder bore having a greater cross-sectional area relative to said intermediate portion of said press cylinder bore;

said sleeve having an outer sleeve surface for engaging with said intermediate portion of said press cylinder bore; and said retaining means comprising a first and a second locking ring for interlocking with said press cylinder bore and engaging with said first and second ends of said sleeve for removably retaining said sleeve within said intermediate portion of said press cylinder bore.

19. An improved press for pressing a compressible material with a fluid under pressure from a fluid pressure source, comprising in combination;

a press cylinder having a press cylinder bore;

a sleeve defining a sleeve bore disposed within said cylinder bore;

said sleeve bore being adapted to receive the compressible material therein;

retaining means for removably retaining said sleeve within said press cylinder bore;

forming tool means extending into said sleeve bore;

pressure means for applying the fluid under pressure from the fluid pressure source to said forming tool means for moving said forming tool means to press the compressible material therebetween;

said first and second end portion of said press cylinder bore have a greater cross-sectional area relative to said intermediate portion of said press cylinder bore;

said press cylinder bore having first and second intermediate threads disposed adjacent a first and a second end of said intermediate portion of said press cylinder bore;

said sleeve having an outer sleeve surface for engaging with said intermediate portion of said press cylinder bore; and said retaining means comprising a first and a second threaded locking ring for threadably engaging with said first and second intermediate threads with first and second locking rings simultaneously engaging with said first and second ends of said sleeve for removably retaining said sleeve within said intermediate portion of said press cylinder bore.

20. An improved press as set forth in claim 15, wherein said first and second closure includes means for removably interlocking said first and second closure relative to said first and second ends of said press cylinder.

21. An improved press as set forth in claim 15, wherein said first and second ends of said press cylinder comprises first and second end threads; and said first and said second closure having first and second closure threads for threadably engaging with said first and second end threads for removably sealing said first and second ends of said press cylinder bore, respectively.

22. An improved press as set forth in claim 15, wherein said pressure means includes a first and a second pressure port defined in said first and second closures for communicating the fluid under pressure from a fluid pressure source into said first and second outer fluid volumes.

23. An improved press as set forth in claim 15, including valve means for individually applying the fluid under pressure from the fluid pressure source to each of said first and second forming tools.

24. An improved press as set forth in claim 15, including press pivot means disposed relative to said press cylinder;

support pivot means disposed relative to a support for pivotably supporting said press cylinder relative to said support.

25. An improved press as set forth in claim 15, wherein said first and second closures define a first inner fluid volume between said first driver plate and said first end of said sleeve and for defining a second inner fluid volume between said second driver plate and said second end of said sleeve; and a first and a second vacuum port communicating with said first and second inner fluid volumes for evacuating said sleeve bore and the compressible material therein.

* * * * *